STEPHEN USTICK.
LUBRICATOR.

No. 121,557.   5 Sheets--Sheet 1.   Patented Dec. 5, 1871.

WITNESSES.
Thomas J. Bewley
Thos. W. Town Jr.

INVENTOR.
Stephen Ustick

5 Sheets--Sheet 2.

STEPHEN USTICK.
LUBRICATOR.

No. 121,557. Patented Dec. 5, 1871.

WITNESSES.
Thomas J. Bewley
Theo. W. Town Jr.

INVENTOR.
Stephen Ustick

AM. PHOTO-LITHOGRAPHIC CO. N.Y. (OSBORNE'S PROCESS.)

STEPHEN USTICK.
LUBRICATOR.

No. 121,557. Patented Dec. 5, 1871.

INVENTOR.
Stephen Ustick

WITNESSES.
Thomas J. Bewley
Theo. N. Town Jr.

STEPHEN USTICK.
LUBRICATOR.
No. 121,557. Patented Dec. 5, 1871.

WITNESSES
Thomas J. Bewley
Theo. N. Town Jr.

INVENTOR
Stephen Ustick

STEPHEN USTICK.
LUBRICATOR.
No. 121,557. Patented Dec. 5, 1871.

5 Sheets--Sheet 5.

WITNESSES.
Thomas J. Bewley
Dunlap T. Pratt

INVENTOR.
Stephen Ustick

121,557

UNITED STATES PATENT OFFICE.

STEPHEN USTICK, OF PHILADELPHIA, PENNSYLVANIA.

IMPROVEMENT IN LUBRICATORS FOR CAR-JOURNALS.

Specification forming part of Letters Patent No. 121,557, dated December 5, 1871; antedated November 20, 1871.

*To all whom it may concern:*

Be it known that I, STEPHEN USTICK, of the city of Philadelphia and State of Pennsylvania, have invented certain Improvements in Lubricators for Car-Journal Bearings, of which the following is a specification:

The nature of my invention mainly consists in the combination of a strip or strips of fibrous material with the under edges of the bearing and periphery of the journal, by means of horizontal rods or supports, and with an oil-reservoir, in such a manner that the oil which passes through the strips by capillary attraction shall be distributed upon the journal to lubricate the same, the upper ends of the said lubricating-strips being in immediate contact with the journal, or else having an intermediate connection by means of pads of fibrous or porous material, as hereinafter described.

Figure 1:
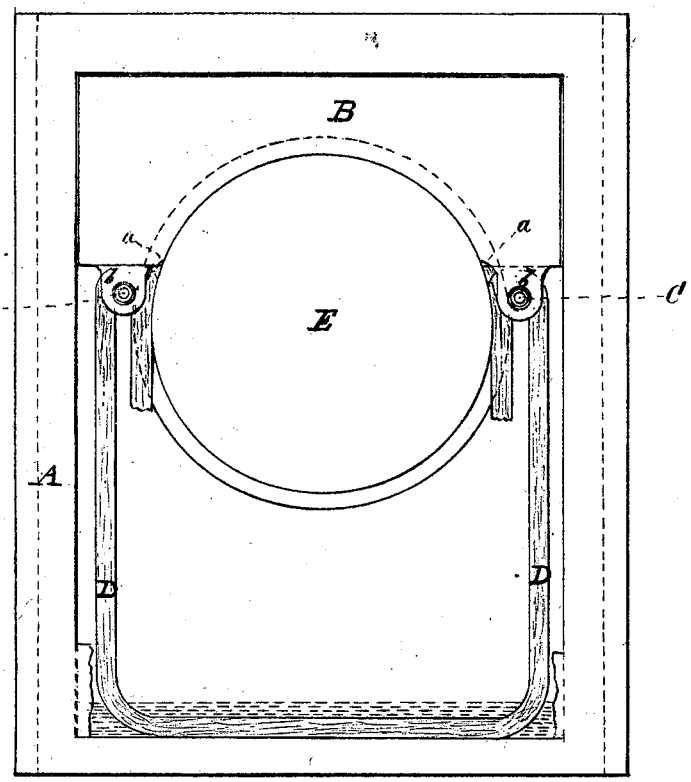
Figure 2:
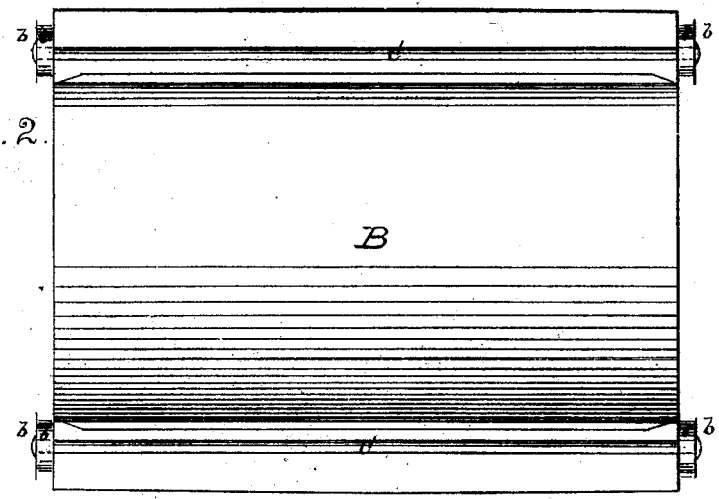
Figure 3:
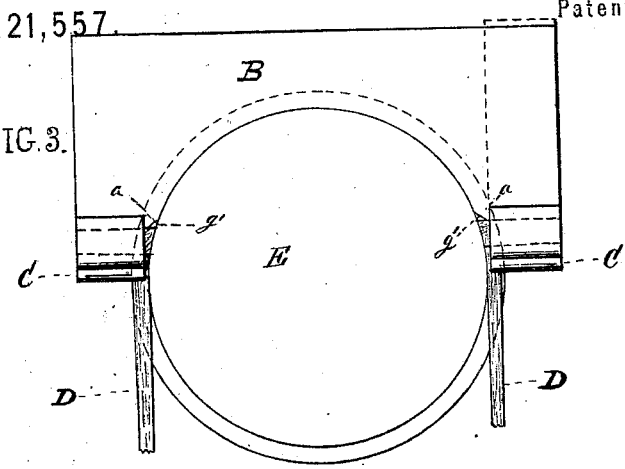
Figure 4:
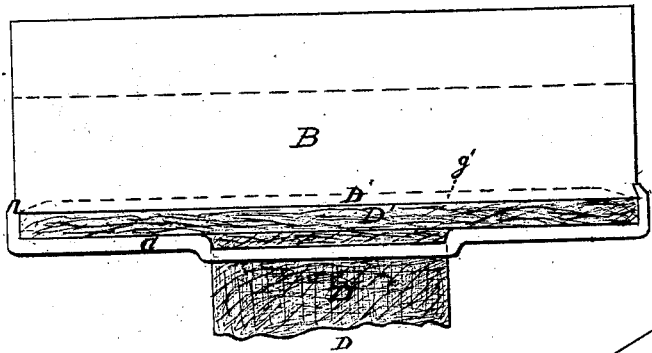
Figure 5:
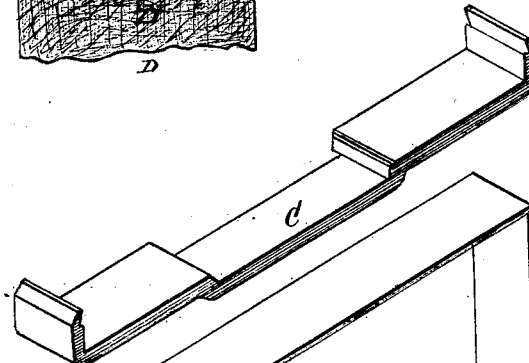
Figure 6:
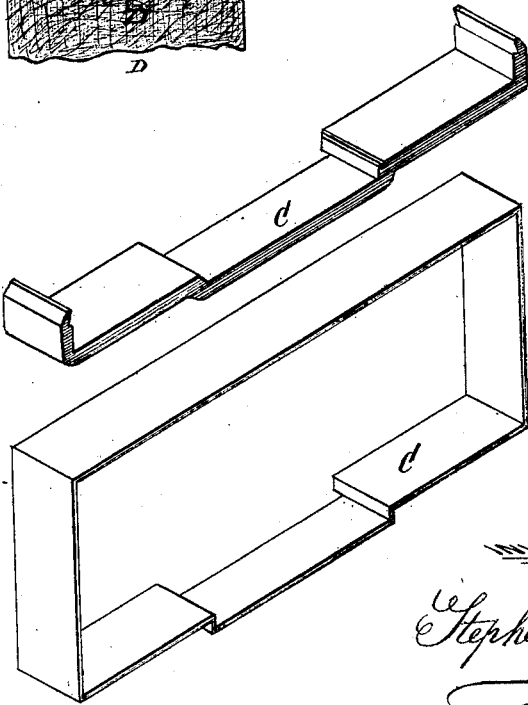
Figure 7:
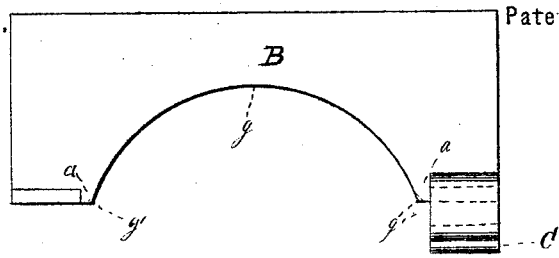
Figure 8:
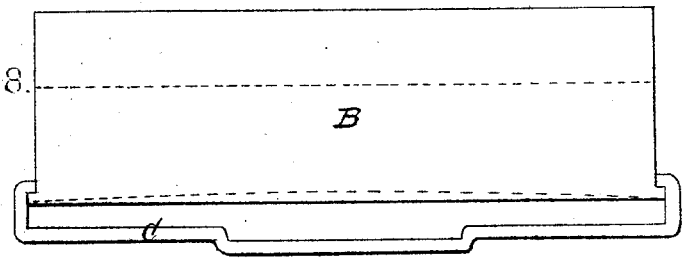
Figure 9:
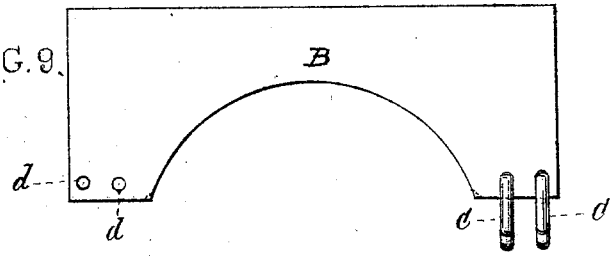
Figure 10:
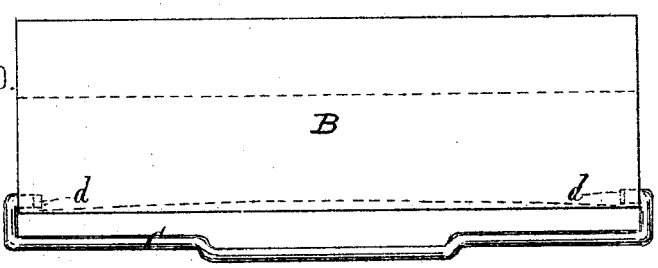
Figure 11:
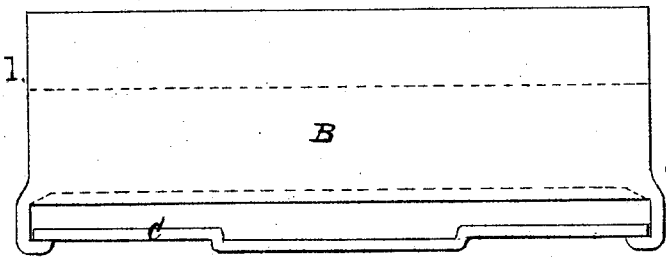
Figure 12:
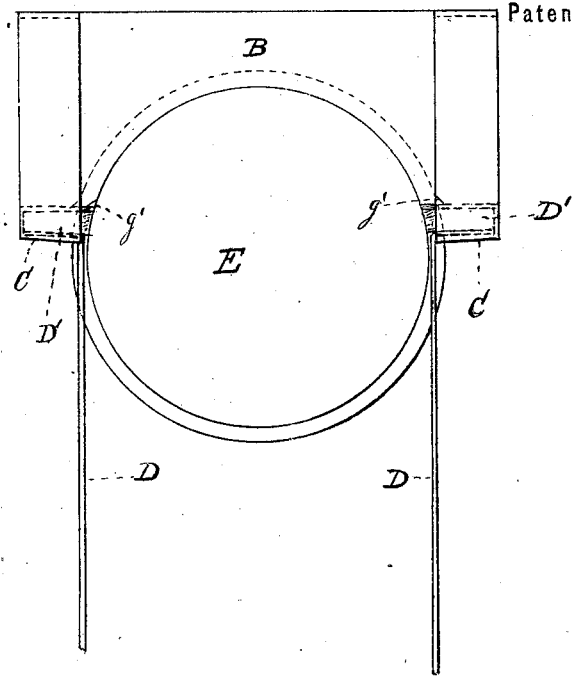
Figure 13:
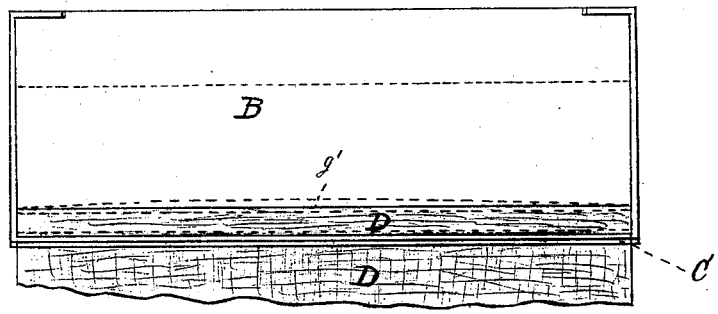
Figure 14:
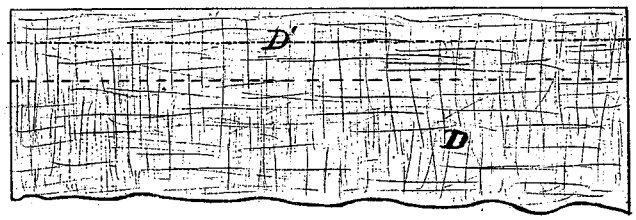
Figure 15:
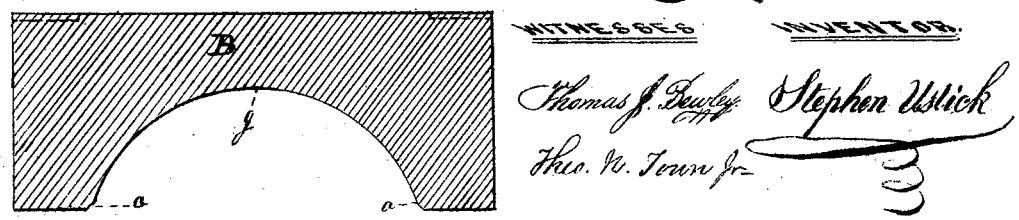
Figure 16:
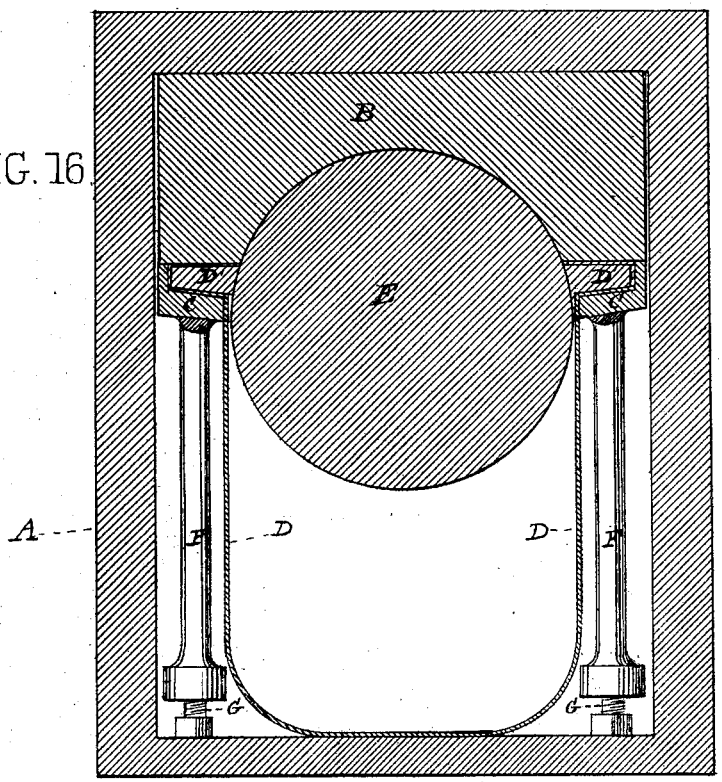
Figure 17:
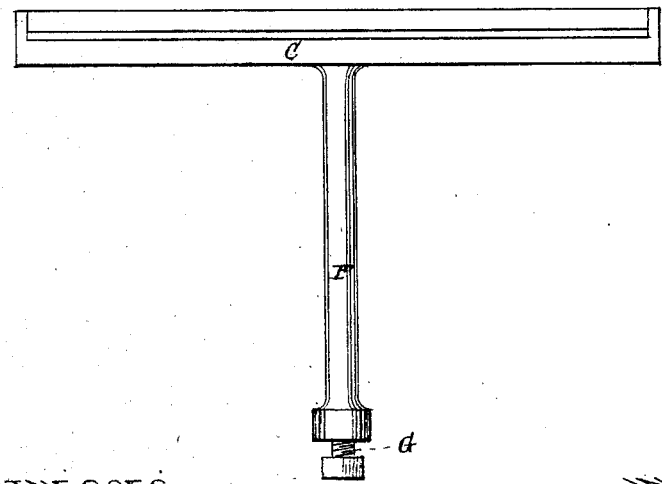

In the accompanying drawing which makes a part of this specification, Figure 1 represents an end view of an ordinary car-box, A, a bearing, B, provided with supporting-rods C C, journal E, and strips of felt D, in combination. Fig. 2 is a reversed plan of the bearing B and supporting-rods C C. Fig. 3, Plate 2, is an end view of a bearing, B, provided with flat supporting-bars C C, journal E, strips of felt D, and strips or pads D'. Fig. 4 is a side view of the same pieces with the exception of the journal. Fig. 5 is an isometrical view of one of the supporting-bars C. Fig. 6 is a modification of the same. Fig. 7, Plate 3, is an end view of the bearing B and one of the supporting-rods C. Fig. 8 is a side elevation of the same. Figs. 9 and 10 are an end and side views of the bearing B, representing a modified form of connecting the supporting-rods with the same. Fig. 11 is a side elevation of the bearing B, showing a modification of the supporting-bars C with the bearing. Figs. 12 and 13 represent a modification in the construction of the supporting-bars, and their connection with the bearing. Fig. 14 is a face view of a thin strip, D, in connection with a strip or pad, D'. Fig. 15 is an end view of the bearing B, representing the bevel *a*. Fig. 16, Plate 5, is a cross-section of an ordinary oil-box, A, bearing B, journal E, and parts in connection therewith, showing a modification in the mode of supporting the upper ends of the strip D and the pads D'. Fig. 17 is a side elevation of one of the supporting-bars C.

Like letters in all the figures indicate the same parts.

A, Fig. 1, is an ordinary car-box. B is the bearing, to which is connected rods C C, which support the lubricating strips of felt, D, at their upper ends. The strips are held up against the lower edges of the bearing and press against the journal E to lubricate the same. The oil passes by capillary attraction from the middle portion of the strip, which lies in oil in the bottom of the box. The strip is swelled out by the oil and pressed against the journal at the corners *a a* of the bearing, so as to wipe off the oil from the latter to prevent its being carried around and thrown off of the journal by its rapid revolutions. The ends of the rods C C are supported by means of the ears *b b* at the end of the bearing B, represented in Figs. 1 and 2. Various modifications may be made in the mode of connecting the rods C with the bearing, one of which is shown in Figs. 9 and 10, in which the ends of the bearings have holes, *d*, which receive the bent ends of the rods. Instead of round rods, flat bars or other supports, C, may be used, as shown in Figs. 3, 4, 5, 6, 7, 8, 11, 12, and 13. To avoid the necessity of using wide strips of felt equal to the whole length of the journal I sometimes use a narrow strip for conveying the oil from the oil-chambers, and combine its upper ends with strips D' for distributing the oil on the journal, as shown in Figs. 3 and 4, Plate 2. In this case the middle portion of the rods or bars C are depressed, as seen in Figs. 3 to 11 inclusive. In Figs. 12 and 13, Plate 4, a thin strip of felt, D, is used, the width covering the whole length of the journal, the upper ends of the strip being sewed fast to the strips D', as seen in Fig. 14. This arrangement supersedes the necessity of using thick felt except in the narrow strips D'. Another mode of supporting the pad D' is shown in Fig. 16. The supporting-bars C C are in connection with the upper end of the uprights F F, which are provided with adjustable screws G G at their lower ends. This mode is well adapted to bearings already in use, as it dispenses with the necessity of any alteration. In order to facilitate the passage of the oil to the wearing-surface of the bearing the corners of the face *g* are taken off except at the ends of the bearings, as shown clearly in Fig. 15, Plate 4. This produces a small space, *g'*, into which the oil flows from the strips D', and is drawn by the journal E to the wearing-surface of the bearing. It must readily appear, while the distributing-pads D' act as wipers to prevent the oil being carried around by and thrown off the periphery of the journal as it leaves the edge of the bearing, that as the whole under side of the journal is left bare between the two pads, abundant opportunity is left for grit or other dirt being thrown down into the lower part of the car-box.

What I claim as my invention, and desire to secure by Letters Patent, is—

1. The combination and arrangement of the pads D' D' with the bearing B and journal E, the said pads being held in position by means of bars or supports C, substantially in the manner and for the purpose above set forth.

2. The combination and arrangement of the absorbent strips D with the pads D' and bars or supports C, the said absorbent strips being arranged and operating in relation to the journal E and oil-reservoir, substantially in the manner described, and for the purpose specified.

In testimony that the above is my invention I have hereunto set my hand and affixed my seal this 12th day of April, 1871.

STEPHEN USTICK. [L. S.]

Witnesses:
JOHN H. PLATT,
THOMAS J. BEWLEY. (87)